(12) United States Patent
Fujisawa et al.

(10) Patent No.: US 9,001,492 B2
(45) Date of Patent: Apr. 7, 2015

(54) ELECTRODE SINTERED BODY, MULTILAYER ELECTRONIC DEVICE, INTERNAL ELECTRODE PASTE, A MANUFACTURING METHOD OF ELECTRODE SINTERED BODY AND A MANUFACTURING METHOD OF MULTILAYER ELECTRONIC DEVICE

(75) Inventors: Ryuji Fujisawa, Tokyo (JP); Mayumi Suzuki, Tokyo (JP); Kyotaro Abe, Tokyo (JP)

(73) Assignee: TDK Corporation, Tokyo (JP)

( * ) Notice: Subject to any disclaimer, the term of this patent is extended or adjusted under 35 U.S.C. 154(b) by 366 days.

(21) Appl. No.: 13/396,154

(22) Filed: Feb. 14, 2012

(65) Prior Publication Data
US 2012/0218677 A1     Aug. 30, 2012

(30) Foreign Application Priority Data

Feb. 28, 2011   (JP) .................................. 2011-042051
Nov. 1, 2011    (JP) .................................. 2011-239842

(51) Int. Cl.
| H01G 4/008 | (2006.01) |
| H01G 4/06 | (2006.01) |
| H01G 4/12 | (2006.01) |
| H01G 4/30 | (2006.01) |
| B22F 7/04 | (2006.01) |
| C22C 1/04 | (2006.01) |
| B22F 3/10 | (2006.01) |

(52) U.S. Cl.
CPC ................. *H01G 4/12* (2013.01); *H01G 4/008* (2013.01); *H01G 4/30* (2013.01); *B22F 7/04* (2013.01); *C22C 1/0416* (2013.01); *C22C 1/0433* (2013.01); *C22C 1/0491* (2013.01); *B22F 3/1021* (2013.01); *B22F 2999/00* (2013.01)

(58) Field of Classification Search
CPC ........ H01G 4/008; H01G 4/12; C22C 19/007; C22C 19/03; C22C 21/00
USPC ....................... 361/305, 321.2; 420/460, 550; 252/521.2
See application file for complete search history.

(56) References Cited

U.S. PATENT DOCUMENTS

| 4,762,558 A * | 8/1988 | German et al. ................. 75/246 |
| 6,030,472 A * | 2/2000 | Hajaligol et al. ............. 148/651 |
| 6,746,508 B1 * | 6/2004 | Deevi et al. ..................... 75/255 |
| 7,547,344 B2 * | 6/2009 | Deevi et al. ..................... 75/228 |
| 2008/0073621 A1 | 3/2008 | Suzuki et al. |

FOREIGN PATENT DOCUMENTS

| JP | A-61-121205 | 6/1986 |
| JP | A-6-84608 | 3/1994 |
| JP | A-2004-80048 | 3/2004 |
| JP | A-2004-330247 | 11/2004 |
| JP | B2-4098329 | 6/2008 |
| WO | WO 2006/025201 A1 | 3/2006 |

* cited by examiner

*Primary Examiner* — David M Sinclair
(74) *Attorney, Agent, or Firm* — Oliff PLC (57) ABSTRACT

An object of the present invention is to provide an electrode sintered body wherein shrinkage is prohibited and conductivity is good. An electrode sintered body including intermetallic compound comprising nickel and aluminum is provided. And then an internal electrode paste, which can inhibit shrinkage of an internal electrode layer, is manufactured by raising sintering temperature of conducting particle materials constituting internal electrode sheet to be internal electrode layers after firing. Further, a high-function multilayer electronic device using electrode paste for internal electrodes is manufactured.

9 Claims, 2 Drawing Sheets

ELECTRODE SINTERED BODY, MULTILAYER ELECTRONIC DEVICE, INTERNAL ELECTRODE PASTE, A MANUFACTURING METHOD OF ELECTRODE SINTERED BODY AND A MANUFACTURING METHOD OF MULTILAYER ELECTRONIC DEVICE

BACKGROUND OF THE INVENTION

1. Field of the Invention

The present invention relates to electrode sintered body, multilayer electronic device, internal electrode paste, a manufacturing method of electrode sintered body using the internal electrode paste and a manufacturing method of multilayer electronic device.

2. Description of the Related Art

There is a pronounced tendency toward higher performance and further reduction in size for the present multilayer electronic device. Particularly for a multilayer ceramic capacitor, there is a strong tendency toward a high capacity and further reduction in size. The multilayer ceramic capacitor has a plural number of layers, which dielectric layers and internal electrode layers are alternately stacked. The internal electrode layers are obtained by firing conducting particle materials. Nickel particles are generally used for conducting particle materials.

One of the manufacturing methods of a multilayer ceramic capacitor is a method wherein internal electrode sheets, which become internal electrode layers after firing, and green sheets, which become dielectric layers after firing, are alternately stacked, and then the stacked body is fired.

Nickel particles are included in the internal electrode sheets and dielectric powders are included in the green sheets.

For instance, internal electrode sheets are formed by coating internal electrode paste, in which nickel particles are included, on green sheets.

However, melting point of nickel particles is low when compared to that of dielectric powders included in green sheets. Therefore, when internal electrode sheets and green sheets are co-fired, nickel particles become over-sintered at sintering temperature range of dielectric powders.

On the other hand, it is essential to make thinner internal electrode layers along with tendency toward a high capacity and further reduction in size. In order to obtain the thinner internal electrode layers, it is required to form thinner internal electrode sheets including nickel particles prior to firing. However, with the thinness, cuttings of internal electrode layers tend to occur when firing, and that the internal electrode layers may not function sufficiently.

In addition, in order to fill sufficient nickel particles in the thinned internal electrode sheets, nickel particles are microparticulated. This may lead to acceleration in over-sintering of nickel particles, and as a result, electrode cuttings of internal electrode layers may become more significant.

As an attempt to prevent electrode cuttings of internal electrode layers, Japanese Patent No. 4098329 discloses a method to inhibit sintering of conductive particles constituting internal electrode layers by alloying (solid solution) nickel particles with high melting point metals, raising melting point of the entire alloy metal and increasing sintering start temperature of conductive particles constituting internal electrode layers.

However, with the method disclosed in Japanese Patent No. 4098329, although there is an effect to inhibit sintering, high melting point metals are generally high-cost and that effective productivity is limited.

Further, as the other method to prevent sintering of nickel particles constituting internal electrode layers, it is general to prevent contacts between nickel particles. In particular, inhibitor particles of fine particle oxides, which is based on the composition constituting dielectric layers, are added to internal electrode layers.

Once sintering of nickel particles is started, sintered nickel particles flip the inhibitor. Therefore, sintering inhibition cannot be expected when firing temperature range is 1000° C. or more.

From these points of view, International Publication No. 20061025201 discloses a method to inhibit sintering by adding inhibitors, which has a high-wettability to nickel particles even at a high temperature.

However, although International Publication No. 2006/025201 shows sintering inhibitory effect by the inhibitor particles at 900° C. or more, sintering inhibitory effect at 1,000° C. or more, which is over-sintering temperature range of nickel particles, is not obvious, and that the publication is insufficient.

Further, Japanese Patent Publication No. 2004-80048A and Japanese Patent Publication No. 2004-330247A disclose a method to inhibit sintering of nickel particles by coating nickel oxides on the nickel particles and inhibiting sintering of nickel particles with steric hindrance of the nickel oxides.

However, with the method described in Japanese Patent Publication No. 2004-80048A and Japanese Patent Publication No. 2004-330247A, the obtained results vary widely due to coating conditions and that the method is not fully effective.

Considering above, even when either method is attempted, sufficient sintering inhibitory effect of internal electrode layers cannot be expected in a multilayer ceramic capacitor having ultrathin internal electrode layers, leading to a decrease in capacitor capacity by electrode cuttings of the internal electrode layers after firing.

Further, as a solution for a technological problem to decrease sintering temperature of external electrodes using Ni metal particles, Japanese Patent Publication S61-121205A discloses a method wherein Al powder is added to Ni powder and then the mixed powder is fired as electrodes. However, in case the method is used for internal electrodes, Al powder will be oxidized and deposited as an aluminum oxide under a reduced atmosphere, generally used when firing multilayer ceramic capacitor, and as a result, electrode cuttings of internal electrode layers cannot be prevented which is no different from the sintering Ni powder alone. Further, with the method, a large amount of aluminum oxide will be deposited and that sufficient conductivity cannot be secured.

Further, as a solution for a technological problem to improve oxidation resistance of internal electrodes, Japanese Patent Publication HG-84608A discloses a multilayer ceramic device having Ni Al alloy as internal electrodes obtained by firing electrodes of Ni Al alloy powder. However, Ni Al alloys show specific crystal structures in accordance with their composition ration, and Japanese Patent Publication H6-84608A does not particularly describe an effective crystal structure for sintering inhibition. Therefore, in Ni Al alloys which do not posses the particular crystal structures, Al of said Ni Al alloys will be oxidized and become aluminum oxides when fired under a reduced atmosphere, a general atmosphere for firing multilayer ceramic capacitor, leading to a decomposition of Ni Al alloys and thus to a generation of Ni metals. With this method, although a certain sintering inhibitory effect can be seen, a large amount of aluminum oxide will be deposited and that sufficient conductivity cannot be secured.

BRIEF SUMMARY OF THE INVENTION

The present invention has been made by considering the above circumstances, and a purpose of the present invention is to provide an electrode sintered body wherein shrinkage is inhibited and show a good conductivity. Further, the other purpose of the present invention is to provide a multilayer electronic device including internal electrode layers wherein shrinkage is inhibited. Furthermore, the other purpose of the invention is to raise sintering temperature of conducting particle materials constituting internal electrode sheet which become internal electrode layers after firing in order to provide an internal electrode paste which can inhibit the shrinkage of internal electrode layers, to provide a manufacturing method of electrode sintered body using the internal electrode paste, and to provide a manufacturing method of multilayer electronic device.

The present inventors have found that electrode sintered body, wherein shrinkage is inhibited, can be obtained by making a part of electrode sintered body or internal electrode layers to a predetermined intermetallic compound, achieving completion of the present invention.

Namely, the present invention solving the above problems provides an electrode sintered body having intermetallic compound comprising nickel and aluminum, wherein a ratio of total intermetallic compound to 100 mass % of the electrode sintered body is 30 to 100 mass %.

According to the electrode sintered body of the present invention, shrinkage will be inhibited and good conductivity can be obtained.

According to the electrode sintered body of the present invention, the intermetallic compound preferably includes at least one of NiAl (crystal structure: B2 structure) and $Ni_3Al$ (crystal structure: L12 structure).

According to the electrode sintered body of the present invention, the intermetallic compound preferably includes NiAl, and a ratio of NiAl with respect to 100 mass % of the electrode sintered body is 2 mass % or more.

According to the electrode sintered body of the present invention, the intermetallic compound preferably includes $Ni_3Al$, and a ratio of $Ni_3Al$ to 100 mass % of the electrode sintered body is 5 mass % or more.

The present invention is a multilayer electronic device having a stacked body, in which a plural number of dielectric layers and internal electrode layers are alternately laminated, wherein the internal electrode layers have intermetallic compound comprising nickel and aluminum, and a ratio of total intermetallic compound with respect to 100 mass % of the internal electrode layers is 30 to 100 mass %.

According to the present invention, internal electrode layers in which shrinking are suppressed can be obtained. Thus, multilayer electronic device with low occurrence of delamination between internal electrode layers and dielectric layers, low occurrence of crack, and less structural defect can be obtained.

According to the multilayer electronic device of the present invention, the intermetallic compound preferably includes at least one NiAl and $Ni_3Al$ According to the multilayer electronic device of the present invention, the intermetallic compound preferably includes NiAl, and a ratio of NiAl with respect to 100 mass % of the internal electrode layers is 2 mass % or more.

According to the multilayer electronic device of the present invention, the intermetallic compound preferably includes $Ni_3Al$, and a ratio of $Ni_3Al$ with respect to 100 mass % of the internal electrode layers is 5 mass % or more.

The present invention is an internal electrode paste including conducting particle materials, binder and solvent, wherein the conducting particle materials include intermetallic compound comprising nickel and aluminum, and a ratio of total intermetallic compound with respect to 100 mass % of the conducting particle materials is 30 to 100 mass %.

By using the internal electrode paste of the present invention, sintering temperature of conducting particle materials can be raised suppressing shrinkage of internal electrode layers and also improving conductivity of internal electrode layers.

According to the internal electrode paste of the present invention, preferably the conducting particle materials further include nickel particles.

According to the internal electrode paste of the present invention, preferably the intermetallic compound includes at least one of NiAl and $Ni_3Al$.

According to the internal electrode paste of the present invention, the intermetallic compound preferably includes NiAl, and a ratio of NiAl with respect to 100 mass % of the conducting particle materials is 5 mass % or more.

According to the internal electrode paste of the present invention, the intermetallic compound preferably includes $Ni_3Al$, and a ratio of $Ni_3Al$ with respect to 100 mass % of the conducting particle materials is 5 mass % or more.

Further, the present invention is a manufacturing method of electrode sintered body comprising the steps of obtaining an electrode perform by coating the internal electrode paste on a substrate and firing the electrode preform.

Furthermore, the present invention is a manufacturing method of multilayer electronic device comprising the steps of obtaining a stacked body in which a plural number of green sheets, including dielectric powder and binder, and internal electrode sheets, obtained from the internal electrode paste, are alternately laminated and firing the stacked body.

DESCRIPTION OF THE PREFERRED EMBODIMENTS

Below, the present invention will be explained on the basis of embodiments shown in the drawings.

Multilayer Ceramic Capacitor 1

Figure 1:
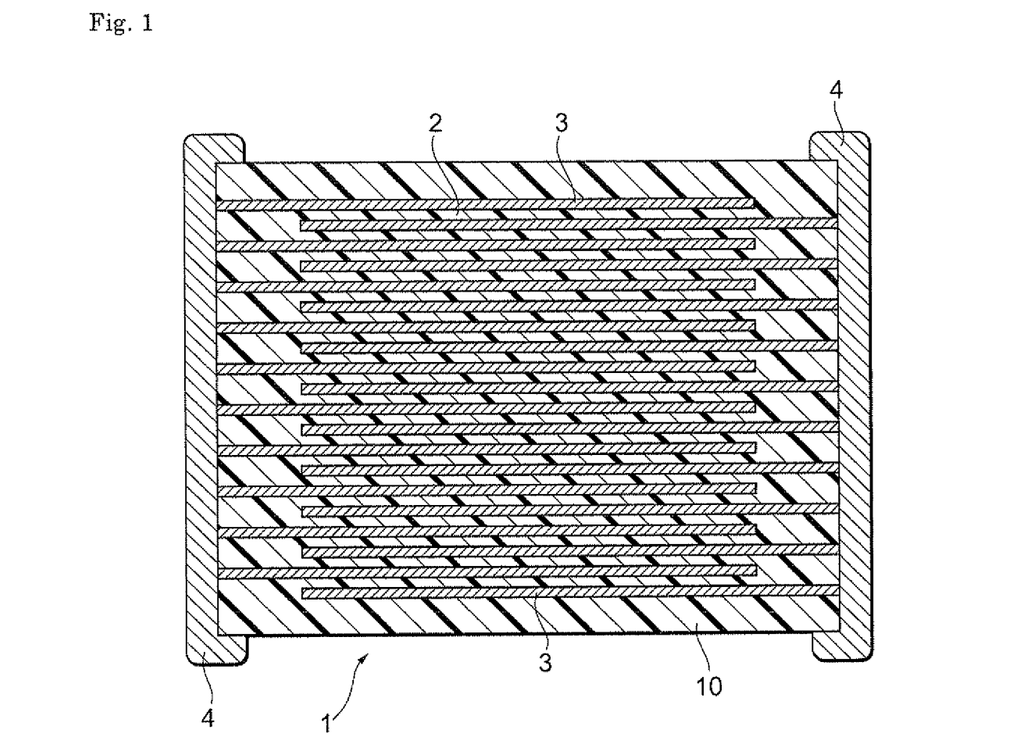
FIG. 1 is a schematic cross-sectional view of a multilayer ceramic capacitor according to an embodiment of the present invention.

As shown in FIG. 1, a multilayer ceramic capacitor 1 according to an embodiment of the present invention comprises a capacitor element body 10 configured by alternately laminated dielectric layers 2 and internal electrode layers 3. End portions on both sides of the capacitor element body 10 are formed with a pair of external electrodes 4 respectively conducting to the internal electrode layers 3 arranged alternately in the capacitor element body 10. Although a shape of capacitor element body 10 is not particularly limited, it is generally a rectangular parallelpiped. Further, its size is also not particularly limited and may be a suitable size according to its use.

The internal electrode layers 3 are laminated, so that the respective end surfaces are exposed alternately to surfaces of two facing end portions of the capacitor element body 10.

Also the pair of the external electrode 4 is formed on both end portions of the capacitor element body 10 and connected to the exposed end surfaces of the alternately arranged internal electrode layers 3, so that a capacitor circuit is configured.

Dielectric Layers 2

Dielectric layers 2 are formed by firing the below mentioned green sheet. Materials of dielectric layers 2 are not particularly limited and the layers 2 is composed from dielectric materials having such as barium titanate, barium calcium titanate, barium calcium zirconate titanate, barium strontium titanate and barium zirconate titanate as main component.

Although thickness of dielectric layers 2 as is shown in FIG. 1 is not particularly limited, it is preferably 1.0 μm or less, more preferably 0.9 to 0.4 μm. By making the thickness of dielectric layers 2 as is mentioned, a high capacity electronic component can be obtained even when there is a further reduction in size.

Internal Electrode Layers 3

Internal electrode layers of the present embodiment includes intermetallic compound comprising nickel and aluminum (hereinafter, referred as "Ni—Al intermetallic compound"). As for Ni—Al intermetallic compound, it is preferably at least one selected from NiAl, $Ni_3Al$, $Ni_5Al$, $Ni_2Al_3$, and $NiAl_3$, and more preferably, NiAl or $Ni_3Al$.

Figure 2:
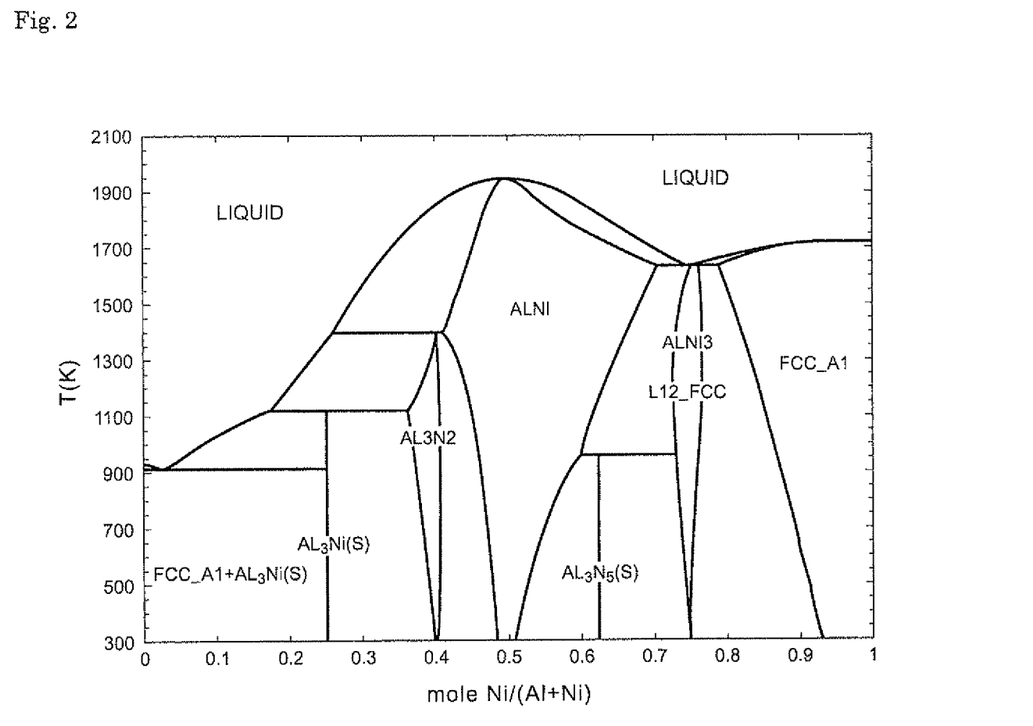
FIG. 2 is a phase diagram of a metal compound comprising nickel and aluminum.

It is general to alternately stack internal electrode sheets, which become internal electrode layers after firing, and green sheets, which become dielectric layers after firing, and co-fire thereof. Said firing temperature is set approximately at 1200° C., which is a sintering temperature of dielectric powders constituting dielectric layers. However, sintering temperature of conducting particle materials constituting internal electrode sheets is lower than that of dielectric powders constituting dielectric layers. For instance, as is shown in FIG. 2, melting point of nickel is 1455° C. or more. Therefore, conducting particle materials, composed from nickel included in conventional internal electrode layers, will be over-sintered at around 1200° C., leading to a rise in shrinkage rate of the internal electrode layers and to a significant occurrence of electrode cuttings.

However, in the present embodiment, conducting particle materials constituting internal electrode layers include Ni—Al intermetallic compound, therefore, sintering temperature of the conducting particle materials rises and shrinkage of internal electrode layers will be inhibited. And as a result, it becomes possible to suppress electrode cuttings of internal electrode layers. This will enable to improve capacitor capacity and structural defects, such as delamination between internal electrode layers and dielectric layers and cracks in a stacked body, can be suppressed.

Conventionally, inhibitor was included in internal electrode sheets for sintering inhibition. However, when inhibitor is included in internal electrode sheets, the inhibitor may diffuse into green sheets during firing, which leads to a deviation of dielectric layer composition. However, as is mentioned above, Ni—Al intermetallic compound itself is difficult to be over-sintered, and that sintering inhibition effect can be obtained even when inhibitor, conventionally included in internal electrode layers for sintering inhibition, is not added. Therefore, deviation of dielectric layer composition will not occur by the inhibitor diffusion during firing, and that it is possible to reduce negative impacts on electric properties including reliability of capacitor.

In the present embodiment, it is preferable that said internal electrode layers further include a single phase comprising nickel.

Ratio of total Ni—Al intermetallic compounds included in internal electrode layers with respect to 100 mass % of the internal electrode layers is 30 to 100 mass %. By determining the total ratio of Ni—Al intermetallic compounds included in internal electrode layers within the above range, shrinkage of internal electrode layer can be inhibited. From this point of view, total ratio of Ni—Al intermetallic compound included in internal electrode layers with respect to 100 mass % of the internal electrode layers is preferably 50 to 100 mass %.

In the present embodiment, NiAl ratio with respect to 100 mass % of the internal electrode layers is preferably 2 mass % or more. By determining NiAl ratio within the above range, shrinkage of the internal electrode layers can be inhibited. From this point of view, NiAl ratio with respect to 100 mass % of the internal electrode layers is preferably 20 mass % or more, more preferably, 40 mass % or more.

In the present embodiment, it is preferable that ratio of $Ni_3Al$ with respect to 100 mass % of internal electrode layers is 5 mass % or more. By determining the ratio of $Ni_3Al$ within the above range, sintering temperature of conductive particles can be raised and shrinkage of internal electrode layer can be inhibited. From this point of view, ratio of $Ni_3Al$ with respect to 100 mass % of the internal electrode layers is preferably 20 mass % or more, more preferably 40 mass % or more.

Further, in the present embodiment, said internal electrode layers may include Ni alloys other than Ni—Al intermetallic compounds and for instance, an alloy of Ni and one or more element selected from Mn. Cr and Co may be included. Note that, Ni or Ni alloy may include 0.1 mass % or less of various trace components such as P.

In the present embodiment, the internal electrode layers may include trace amount of $Al_2O_3$ (aluminum oxide). When Ni together with NiAl and $Ni_3Al$ are included as below mentioned conducting particle materials, $Ni_5Al_3$ and a trace amount of $Al_2O_3$ may be included other than Ni, NiAl and $Ni_3Al$, as a result. This is due to the fact that compositions of NiAl and that of $Ni_3Al$ change during firing, and will stably be in the form of the other Ni—Al intermetallic compounds. Note that content of $Al_2O_3$ in internal electrode layers is preferably 10 mass % or less, with respect to 100 mass % of internal electrode layers.

Although thickness of internal electrode layers 3 is not particularly limited, it is preferably 1.0 μm or less, more preferably 0.2 to 0.6 μm. Shrinkage of internal electrode layers can be inhibited due to the composition of conducting particles of the present embodiment, and that electrode cuttings can be prevented even when thickness of internal electrode layers are thinned to this extent.

External Electrodes 4

Although conducting materials included in the external electrodes 4 shown in FIG. 1 are not particularly limited, inexpensive Ni, Cu or their alloys can be used in the invention. Thickness of external electrode 4 can be suitably determined according to its use.

Manufacturing Method of Multilayer Ceramic Capacitor

Next, a manufacturing method of multilayer ceramic capacitor according to the present embodiment will be specified.

First, dielectric paste is prepared in order to manufacture green sheets, which constitute dielectric layers 2, shown in FIG. 1, after firing.

In the present embodiment, dielectric paste is obtained by kneading dielectric powder, binder, solvent and, in response to necessity, additives selected from various dispersing agent, plasticizing agent, dielectric body, subcomponent compound and a fritted glass, insulation body and the like, with ball mill and making slurry thereof.

Next, internal electrode paste is prepared in order to form internal electrode sheets constituting internal electrode layers 3, shown in FIG. 1, after firing.

Internal electrode paste of the present embodiment is obtained by kneading conducting particle materials, binder and solvent with ball mill, and making slurry thereof. Note that tackifier, dielectric powder and the like may be added to the internal electrode paste in response to necessity.

Conducting particle materials included in internal electrode paste of the present embodiment may be materials forming the Ni—Al intermetallic compound after firing, and ratio of Ni—Al intermetallic compound with respect to 100 mass % of conducting particle materials is 30 to 100 mass %. In the present embodiment, by including Ni—Al intermetallic compound in conducting particle materials within the above range, sintering temperature of conductive particles can be raised, shrinkage of internal electrodes can be inhibited, and electrode cuttings of internal electrode layers can be prevented. From this point of view, ratio of Ni—Al intermetallic compound with respect to 100 mass % of conducting particle materials is preferably 50 to 100 mass %.

Further, it is preferable that the conducting particle materials further include nickel particles.

Furthermore, it is preferable that the intermetallic compound is at least one of NiAl and $Ni_3Al$.

Ratio of NiAl with respect to 100 mass % of the conducting particle materials is 5 mass % or more. By determining the ratio of NiAl within the above range, sintering temperature of conductive particle materials can be raised and shrinkage of internal electrode layers can be inhibited.

Ratio of $Ni_3Al$ with respect to 100 mass % of the conducting particle materials is 5 mass % or more. By determining the ratio of $Ni_3Al$ within the above range, sintering temperature of conductive particle materials can be raised and shrinkage of internal electrode layers can be inhibited.

Next, green sheets formed by dielectric paste and internal electrode sheets formed by internal electrode paste are alternately laminated to obtain green chip.

The obtained green chip is under a removal binder, firing, and, in response to necessity, annealing processes to become a capacitor element body constituted by sintering body.

Note that temperature rising speed of binder removal process of the preset embodiment is preferably 5 to 300° C./hr. By determining temperature rising speed of binder removal process within the above range, cracks occurred in the element by rapid degassing can be prevented. From this point of view, temperature rising speed of removal binder process is more preferably 10 to 50° C./hr.

Further, holding temperature of binder removal process is preferably 200 to 400° C. By determining holding temperature of binder removal process within the above range, sintering of internal electrode particles during removal binder process can be prevented. From this point of view, said holding temperature of binder removal process is more preferably 250 to 350° C.

Further, holding time of binder removal process is preferably 0.5 to 20 hrs. By determining the holding time of binder removal process within the above range, binder can be sufficiently degreased. From this point of view, said holding time of binder removal process is more preferably 1 to 10 hrs.

Atmospheric gas of the binder removal process is preferably a mixed gas of $N_2$ and $H_2$.

Temperature rising speed of firing process of the preset embodiment is preferably 5 to 500° C./hr. By determining temperature rising speed of firing process within the above range, shrinkage difference between dielectric layers and electrode layers during firing can be decreased, and that cracks can be prevented. From this point of view, temperature rising speed of firing process is more preferably 200 to 300° C./hr.

Holding temperature of firing process is preferably 1100 to 1300° C. By determining holding temperature of firing process within the above range, dielectrics can be sufficiently fired. From this point of view, holding temperature of firing process is more preferably 1150 to 1250° C. According to the present embodiment, even when holding temperature of firing process is set as high as just described, sintering temperature of conducting particle materials rises and that shrinkage of internal electrode layers can be prevented.

Holding time of firing process is preferably 0.5 to 8 hrs. By determining holding time of firing process within the above range, dielectrics can be sufficiently fired. From this point of view, holding time is more preferably 1 to 3 hrs.

Atmospheric gas of the firing process is preferably a mixed gas of $N_2$ and $H_2$.

And then, a multilayer ceramic capacitor is manufactured by forming external electrodes on the obtained capacitor element body.

The multilayer ceramic capacitor of the present embodiment manufactured as above is mounted on the printed substrate and the like by soldering and the like and is used for variety of electronic apparatuses and etc.

An embodiment of the present invention is explained above, but the present invention is not limited to the above embodiment and may be variously modified within the scope of the present invention.

In the above embodiment, although multilayer ceramic capacitor is exemplified as an electronic component, in which internal electrode layers (electrode sintered body) of the present invention are applied, or as an electronic component obtained by applying internal electrode paste of the present invention, an electronic component, in which internal electrode layers (electrode sintered body) and internal electrode paste of the present invention are applied, is not limited to the multilayer ceramic capacitor, and can be any as far as it is an electronic component having internal electrode layers (electrode sintered body) of the above constitution or an electronic component obtained by applying the internal electrode paste.

According to the present invention, melting point of conducting particle materials can be made higher since conducting particle materials included in internal electrode paste includes intermetallic compound comprising nickel and aluminum. Therefore, when firing internal electrode sheets formed by internal electrode paste, sintering of conducting particle materials constituting internal electrode layers can be sufficiently inhibited even within sintering temperature range (1000° C. or more) of dielectric powders. Accordingly, shrinkage of internal electrode layers can be prevented and internal electrode layers with less electrode cuttings having high continuity can be formed. As a result, capacitor capacity can be improved, and also crack and delamination of internal electrode layers and dielectric layers occurred by over-shrinkage due to over-sintering of internal electrode layers can be prevented.

EXAMPLES

Example 1

In Example 1, electrode sintered body is manufactured with the method described below as samples 1 to 28 and 19s to 22s, then shrinking behavior thereof were evaluated by measuring linear shrinkage rate and conductivity thereof were evaluated by measuring resistivity. Note that "electrode particle composition" described in Tables 1 to 5 defines "composition of conducting particle materials".

Manufacturing Internal Electrode Paste

As conducting particle materials, NiAl, Ni$_3$Al and Ni particles having average particle diameter of approximately 0.2 μm were prepared by blending the amount described in tables 1 to 4. Further, in samples 23 to 27, Ni and Al alloys, which are not a complete single phase of Ni—Al intermetallic compound and shown in Table 4, were used for conducting particle materials. In sample 28, a mixed powder, in which 50 atm % of Ni metal particles and 50 atm % of Al metal particles were mixed, was used for conducting particle materials. Further, 0.2 mass % of anionic dispersing agent as dispersing agent and 10 mass % of dihydroterpineol as solvent were added with respect to 100 mass % of the conducting particle materials, and then sufficiently stirred with painting knife to obtain conducting slurry.

Ethyl cellulose (average molecular weight of approximately 170 thousand) was slowly dissolved in dihydroterpineol by stirring with dissolver in such a way that ethyl cellulose become 10 mass % and ethyl cellulose resin lacquer was obtained. The ethyl cellulose resin lacquer was added to conducting slurry in such a way that ethyl cellulose become 2.0 mass % with respect to conducting particle materials, and then sufficiently stirred with painting knife to obtain electrode slurry.

The above-obtained electrode slurry was kneaded using triple roll mill with low shear, medium shear, high shear and extremely high shear at a total of 6 times in each shear and confirmed that they were sufficiently dispersed by using gauge particle.

0.5 mass % of anionic dispersing agent and 4 mass % of ethyl cellulose with respect to 100 mass % conductive particles were added to the electrode slurry, kneaded to extremely high shear using triple roll mill, and then mixed with low shear triple roll mill to obtain internal electrode paste.

Appropriate amount of the above obtained internal electrode paste was put on aluminum foil, dried for 30 minutes at 220° C., and its solid content mass was measured. Then, from the measured value of the solid content mass, mass of conductive particles in internal electrode paste was obtained and, in order that mass of conductive particles become 45 mass % with respect to the obtained internal electrode paste in final form, the paste was diluted with dihydroterpineol, sufficiently stirred with painting knife, and subsequently, stirred with rotation-revolution-mixer to obtain internal electrode paste in final form.

Manufacturing Internal Electrode Sheet

Internal electrode paste obtained above was film formed on release PET film by using applicator. The film formed internal electrode paste was dried at 100° C./hr and dried internal electrode sheet was obtained. Note that thickness of the dried internal electrode sheet is adjusted to 30 to 100 μm.

Manufacturing Electrode Preform

The manufactured dried internal electrode sheets were punched to a predetermined size with a mold, PET film was released, and a predetermined number of the sheets were laminated and pressure bonded with thermal pressure machine at 20 to 100 kg/cm$^2$ under 60° C. The obtained electrode bulk body was cut using dicing saw to obtain 5 mm×5 mm×5 mm electrode preform.

Thermal Treatment Process

Binder removal and firing processes were performed to the obtained electrode preform and internal electrode sintered body was manufactured. Conditions of the binder removal and firing processes were the followings.

<<Binder Removal Process>> temperature rising speed: 5 to 300° C./hr holding temperature: 200 to 400° C.

holding time: 0.5 to 20 hrs atmospheric gas: a mixed gas of N$_2$ and H$_2$

<<Firing Process>> temperature rising speed: 5 to 500° C./hr holding temperature: See Tables 1 to 4 holding time: 0.5 to 8 hrs atmospheric gas: a mixed gas of N$_2$ and H$_2$

Evaluation

Shrinking behavior and conductivity (resistivity) of the above obtained electrode sintered body were evaluated by the following methods. Results are shown in Tables 1 to 4. Further, compositions of the obtained samples were measured with the following methods.

<<Shrinking Behavior (Linear Shrinkage rate)>>

After treating removal binder process, length(L), width (W) and thickness(T) of electrode preform dimensions were measured using micro gauge. After the measurement, firing process was performed and dimension of sintered electrode preform (electrode sintered body) was measured using micro gauge as is the same with above. Length, width and thickness of electrode preform before and after the firing process were measured, dimension change rate thereof were respectively calculated, and their average values were determined as linear shrinkage rate (%). In the present examples, it was evaluated that linear shrinkage rate of less than 15.2% was determined preferable and that of less than 15% was determined more preferable.

<<Conductivity (Resistivity)>>

Figure 3:
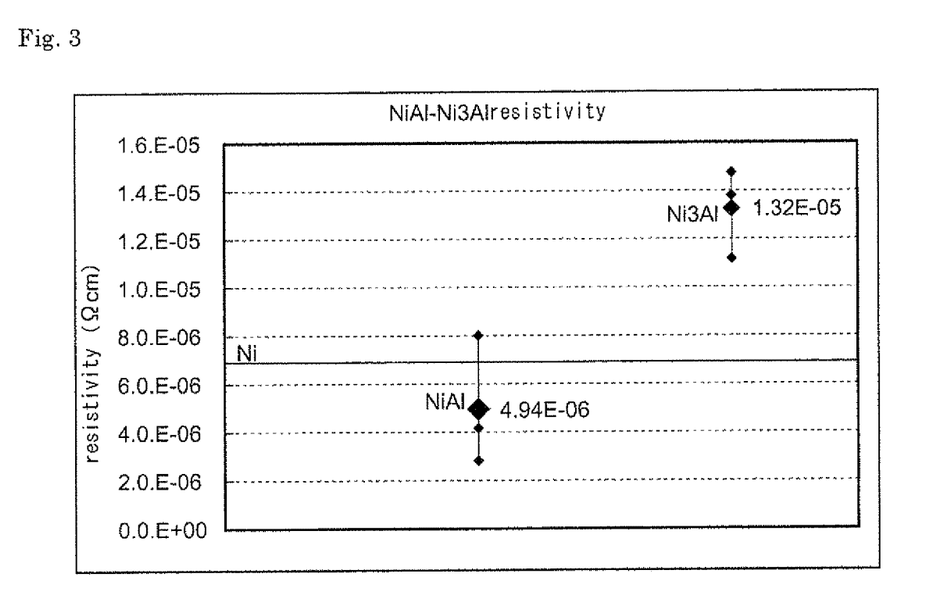
FIG. 3 is a graph showing resistivity of samples obtained from examples and comparative examples of the invention.

Resistance values of each sample were measured by applying four terminal method to the obtained electrode sintered body after firing. The measured resistance values were substituted to the following equation and their resistivity (μΩcm) were measured. Results are shown in Tables 1 to 4. The results are shown in FIG. 3.

resistivity ρ(μΩcm)=resistance value (μΩ)×4.5324× thickness of samples (cm)

Note that preferable range of the resistivity value in the present examples was evaluated to be lee than 50 μΩm.

<<Measurement of Composition of Electrode Sintered Body>>

Composition in electrode sintered body was measured by performing Rietveld analysis of XRD.

Example 2

In Example 2, three samples were respectively manufactured under the conditions of samples 1, 9 and 18, and then resistivity was measured by the above method for each sample and average value of resistivity for each sample was obtained. Results are shown in FIG. 3.

TABLE 1

| No. | Electrode Particle Composition (%) | | | Firing Temp. (° C.) | Electrode Layer Composition after Firing (%) | | | | | Linear Shrinkage Rate (%) | Resistivity (μΩcm) |
| --- | --- | --- | --- | --- | --- | --- | --- | --- | --- | --- | --- |
| | NiAl | Ni3Al | Ni | | NiAl | Ni3Al | Ni5Al3 | Ni | Al2O3 | | |
| Sample 1 | 100 | 0 | 0 | 1200 | 91 | 2 | 0 | 0 | 7 | 4.34 | 18.05 |
| Sample 2 | 90 | 10 | 0 | 1200 | 83 | 9 | 0 | 0 | 8 | 5.33 | 18.47 |
| Sample 3 | 75 | 25 | 0 | 1200 | 69 | 22 | 2 | 0 | 7 | 6.75 | 17.16 |
| Sample 4 | 50 | 50 | 0 | 1150 | 43 | 45 | 6 | 0 | 6 | 3.19 | 28.24 |
| Sample 5 | 50 | 50 | 0 | 1200 | 43 | 46 | 2 | 0 | 9 | 8.91 | 15.16 |
| Sample 6 | 50 | 50 | 0 | 1250 | 42 | 47 | 3 | 0 | 8 | 14.98 | 8.09 |
| Sample 7 | 25 | 75 | 0 | 1200 | 20 | 71 | 2 | 0 | 7 | 10.37 | 16.05 |
| Sample 8 | 10 | 90 | 0 | 1200 | 5 | 86 | 1 | 0 | 8 | 12.14 | 15.32 |
| Sample 9 | 0 | 100 | 0 | 1200 | 0 | 91 | 0 | 0 | 9 | 13.01 | 15.64 |
| Sample 10 | 90 | 0 | 10 | 1200 | 82 | 8 | 2 | 2 | 6 | 5.58 | 16.11 |
| Sample 11 | 50 | 0 | 50 | 1200 | 37 | 13 | 3 | 43 | 4 | 9.71 | 13.23 |
| Sample 12 | 10 | 0 | 90 | 1200 | 5 | 7 | 2 | 84 | 2 | 14.13 | 8.28 |
| Sample 13 | 5 | 0 | 95 | 1200 | 2 | 4 | 0 | 94 | 0 | 14.62 | 7.46 |
| Sample 14 | 0 | 90 | 10 | 1200 | 0 | 83 | 0 | 9 | 8 | 13.34 | 14.58 |
| Sample 15 | 0 | 50 | 50 | 1200 | 0 | 50 | 0 | 45 | 5 | 14.21 | 11.42 |
| Sample 16 | 0 | 10 | 90 | 1200 | 0 | 8 | 0 | 89 | 3 | 14.87 | 7.84 |
| Sample 17 | 0 | 5 | 95 | 1200 | 0 | 5 | 0 | 95 | 0 | 14.96 | 7.31 |

TABLE 2

| No. | Electrode Particle Composition (%) | | | Firing Temp. (° C.) | Electrode Layer Composition after Firing (%) | | | | | Linear Shrinkage Rate (%) | Resistivity (μΩcm) |
| --- | --- | --- | --- | --- | --- | --- | --- | --- | --- | --- | --- |
| | NiAl | Ni3Al | Ni | | NiAl | Ni3Al | Ni5Al3 | Ni | Al2O3 | | |
| Sample 18 | 0 | 0 | 100 | 1200 | 0 | 0 | 0 | 100 | 0 | 15.32 | 6.97 |
| Sample 19 | 3 | 0 | 97 | 1200 | 0 | 1 | 0 | 99 | 0 | 15.19 | 7.28 |
| Sample 20 | 1 | 0 | 99 | 1200 | 0 | 0 | 0 | 100 | 0 | 15.28 | 7.31 |
| Sample 21 | 0 | 3 | 97 | 1200 | 0 | 0 | 0 | 100 | 0 | 15.25 | 7.23 |
| Sample 22 | 0 | 1 | 99 | 1200 | 0 | 0 | 0 | 100 | 0 | 15.32 | 7.07 |

TABLE 3

| No. | Electrode Particle Composition (%) | | | Firing Temp. (° C.) | Electrode Layer Composition after Firing (%) | | | | | Linear Shrinkage Rate (%) | Resistivity (μΩcm) |
| --- | --- | --- | --- | --- | --- | --- | --- | --- | --- | --- | --- |
| | NiAl | Ni3Al | Ni | | NiAl | Ni3Al | Ni5Al3 | Ni | Al2O3 | | |
| Sample 18 | 0 | 0 | 100 | 1200 | 0 | 0 | 0 | 100 | 0 | 15.32 | 6.97 |
| Sample 19s | 10 | 0 | 90 | 1200 | 5 | 7 | 2 | 84 | 2 | 15.13 | 8.28 |
| Sample 20s | 5 | 0 | 95 | 1200 | 2 | 4 | 0 | 94 | 0 | 15.23 | 7.46 |
| Sample 21s | 0 | 10 | 90 | 1200 | 0 | 8 | 0 | 89 | 3 | 15.18 | 7.84 |
| Sample 22s | 0 | 5 | 95 | 1200 | 0 | 5 | 0 | 96 | 0 | 15.3 | 7.31 |

TABLE 4

| No. | Electrode Particle Composition (%) | | Firing Temp. (° C.) | Electrode Layer Composition after Firing (%) | | | | | Linear Shrinkage Rate (%) | Resistivity (%) |
| --- | --- | --- | --- | --- | --- | --- | --- | --- | --- | --- |
| | Electrode Particles | Content (%) | | NiAl | N13Al | Ni5Al3 | Ni | Al2O3 | | |
| Sample 1 | NiAl intermetallic compound | 100 | 1200 | 91 | 2 | 0 | 0 | 7 | 4.34 | 18.05 |
| Sample 23 | Ni 50 Al 50 alloy | 100 | 1200 | 0 | 25 | 0 | 33 | 42 | 4.91 | 58.33 |
| Sample 24 | Ni 20 Al 80 alloy | 100 | 1200 | 0 | 4 | 0 | 19 | 77 | 6.05 | 89.28 |
| Sample 25 | Ni 30 Al 70 alloy | 100 | 1200 | 0 | 4 | 0 | 28 | 68 | 5.88 | 74.23 |
| Sample 26 | Ni 70 Al 30 alloy | 100 | 1200 | 0 | 14 | 0 | 88 | 18 | 8.57 | 58.01 |
| Sample 27 | Ni 90 Al 10 alloy | 100 | 1200 | 0 | 6 | 0 | 89 | 5 | 15.25 | 19.05 |
| Sample 28 | Ni metal 50 + Al metal 50 | 100 | 1200 | 0 | 0 | 0 | 50 | 50 | 13.11 | 71.29 |

From Tables 1 to 3, it was confirmed that resistivity of all samples were less than 50 μΩcm.

Further, from FIG. 3, it was confirmed that resistivity of NiAl alone and that of Ni₂Al alone are nearly equal to that of nickel particle alone.

From Tables 1 to 4, in internal electrode paste, when more than 10 mass % of total Ni—Al intermetallic compounds (NiAl, Ni₃Al and Ni₅Al₃) exist with respect to 100 mass % of conductive particles (Samples 1 to 17), it was confirmed that linear shrinkage rate is preferable, compared to the samples including 10 mass % or less of total Ni—Al intermetallic compounds (samples 18 to 22, 19s to 22s and 23 to 28).

Further, from Tables 1 to 4, in electrode sintered body, when more than 25 mass % of total Ni—Al intermetallic compounds exist with respect to 100 mass % of electrode sintered body (Samples 1 to 17), it was confirmed that linear shrinkage rate is preferable, compared to the samples including 25 mass % or less of total Ni—Al intermetallic compounds (samples 18 to 22, 19s to 22s and 23 to 28).

From FIG. 2, melting point of NiAl out of Ni—Al intermetallic compounds is 1638° C., which is surely higher than melting point (660° C.) of aluminum, is higher than melting point (1455° C.) of nickel. Therefore, by including NiAl as conducting particle materials, sintering of conducting particle materials was difficult to proceed and that shrinkage amount was appeared to be lowered at each firing temperature (1150 to 1250° C.).

On the other hand, although melting point of $Ni_3Al$ out of Ni—Al intermetallic compounds is 1390° C., which is lower than that of normal nickel, certain effects for sintering inhibition could be admitted. Followings can be considered for this reason.

$Ni_3Al$ forms thin and dense $Al_2O_3$ covering on particle surface at sintering starting temperature of $Ni_3Al$ particles. Accordingly, contacting places of $Ni_3Al$ intermetallic compounds (basis material) are few while $Al_2O_3$ coverings contact each other in many places. Therefore, during sintering process, $Al_2O_3$ coverings was sintered at first, and then $Al_2O_3$ was moved on particle interface and converged to triple point. Then, $Ni_3Al$ intermetallic compounds (basis material) contacted each other and were sintered.

With this sintering process, even with $Ni_3Al$ having relatively low melting point, sintering became slow and shrinkage amount became relatively small. Note that NiAl having relatively high melting point went through the same sintering process.

From Table 4, not when a complete Ni—Al intermetallic compound single phase but when an alloy of Ni: 50 atm % and Al: 50 atm % (sample 23), an alloy of Ni: 20 atm % and Al: 80 atm % (sample 24), an alloy of Ni: 30 atm % and Al: 70 atm % (sample 25) or an alloy of Ni: 70 atm % and Al: 30 atm % (sample 26) was used as conducting particle materials, it was confirmed that although good linear shrinkage rate can be obtained, resistivity of electrode sintered body was deteriorated.

It can be considered that although $Ni_3Al$ intermetallic compound as conducting component is included in fired electrode layers, it is influenced by insulation component of $Al_2O_3$ which is included in large amounts. Further, it was confirmed that not when a complete Ni—Al intermetallic compound single phase but when an alloy of Ni: 90 atm % and Al: 10 atm % (sample 27) was used as a conducting particle material, linear shrinkage rate was deteriorated.

Further, when a mixed powder of 50 atm % Ni metal powder and 50 atm % Al metal powder was used as a conducting particle material (sample 28), it was confirmed that although relatively good linear shrinkage rate can be obtained, resistivity of electrode sintered body was deteriorated.

It can be considered that although Ni metal as conducting component is included in fired electrode layers, it is influenced by insulation component of $Al_2O_3$ which is included in large amounts.

Example 3

In example 3, as samples 31 to 35, a multilayer ceramic capacitor was manufactured, a stacked body was obtained, and electrode coating rate was measured by the below method.

Forming Each Electrode Paste

In example 3 (samples 31 to 35), except for preparing NiAl, $Ni_3Al$ and Ni particles having average particle diameter of approximately 0.2 μm by blending the amount described in Table 4 as conductive particles, internal electrode paste was manufactured as similar with example 1.

Dielectric paste for forming green sheet was manufactured as described below. $BaTiO_3$ dielectric powder, polyvinyl butyral resin (PVB) (polymerization degree: 800) as an organic binder, propyl alcohol, xylene, methyl ethyl ketone and 2-butoxyethylalcohol as a solvent and dioctyl phthalate as a plasticizer were prepared.

Next, 6 mass % of PVB, 150 mass % of solvent and plasticizer were respectively weighed with respect to 100 mass % of dielectric powder, kneaded for 21 hrs by ball mill together with zirconia ball having 2 mm diameter, and slurried to obtain dielectric paste. Note that 50 mass % of plasticizer with respect to 100 mass % of polyvinyl butyral was added.

The internal electrode paste was printed with 160 mm×160 mm/pattern on green sheet, obtained by coating the dielectric paste on PET film, using screen printing machine. The printed internal electrode paste was dried for 100 secs by 100° C. of hot-air drying, and wound to a reel as internal electrode printing body, The manufactured internal electrode printing body was removed from PET film together with green sheet by 160 mm×160 mm, and then 200 pieces were laminated under 60° C. and 20 to 100 kg/$cm^2$ to obtain stacked body.

Removal binder and firing processes were performed to the obtained stacked body as similar with example 1, and a stacked body was obtained.

<<Measurement of Electrode Coating Rate>>

Electrode coating rate is a ratio of area where internal electrode layers actually cover the dielectric layers. Electrode coating rate was measured by cutting multilayer ceramic capacitor sample to expose electrode surface, SEM observing the cut electrode surface and image processing thereof. Electrode coating rate of 80% or more was considered good. Results are shown in Table 5.

TABLE 5

|  | Electrode Particle Composition | | | Firing Temp. | Electrode Coating | Determination |
| --- | --- | --- | --- | --- | --- | --- |
|  | NiAl | Ni3Al | Ni | (° C.) | Rate (%) |  |
| Sample 31 | 100 | 0 | 0 | 1200 | 93.7 | OK |
| Sample 32 | 0 | 100 | 0 | 1200 | 90.5 | OK |
| Sample 33 | 50 | 0 | 50 | 1200 | 85.4 | OK |
| Sample 34 | 0 | 50 | 50 | 1200 | 84.9 | OK |
| Sample 35 | 0 | 0 | 100 | 1200 | 69.1 | NG |

From Table 5, it was confirmed that electrode coating rate of samples (samples 31 to 34), wherein Ni—Al intermetallic compound is included in internal electrode paste, were higher than that of a sample (sample 35), wherein Ni—Al intermetallic compound is not included in internal electrode paste.

INDUSTRIAL APPLICABILITY

As mentioned above, electrode sintered body, multilayer electronic device, internal electrode paste, manufacturing method of electrode sintered body and manufacturing method of multilayer electronic device respectively using Ni—Al intermetallic compound of the present invention are useful for reduction in size and higher performance of multilayer electronic device

The invention claimed is:

1. An electrode sintered body comprising an intermetallic compound comprising $Ni_3Al$ and $NiAl$, wherein:
   a ratio of total intermetallic compound with respect to 100 mass % of the electrode sintered body is 30 to 100 mass %; and
   a ratio of $Ni_3Al$ with respect to 100 mass % of the electrode sintered body is 5 mass % or more.

2. The electrode sintered body as set forth in claim 1, wherein a ratio of NiAl with respect to 100 mass % of the electrode sintered body is 2 mass % or more.

3. A multilayer electronic device comprising a stacked body in which a plural number of dielectric layers and internal electrode layers are alternately laminated, wherein the internal electrode layers comprise the electrode sintered body as set forth in claim 1.

4. An internal electrode paste comprising a conducting particle material, a binder, and a solvent, wherein the conducting particle material comprises nickel particles and an intermetallic compound comprising nickel and aluminium, and a ratio of total intermetallic compound with respect to 100 mass % of the conducting particle material is 30 to up to but not including 100 mass %.

5. The internal electrode paste as set forth in claim 4, wherein the intermetallic compound comprises at least one of NiAl and $Ni_3Al$.

6. The internal electrode paste as set forth in claim 4, wherein the intermetallic compound comprises NiAl, and a ratio of NiAl with respect to 100 mass % of the conducting particle material is 5 mass % or more.

7. The internal electrode paste as set forth in claim 4, wherein the intermetallic compound comprises $Ni_3Al$, and a ratio of $Ni_3Al$ with respect to 100 mass % of the conducting particle material is 5 mass % or more.

8. A method of manufacturing an electrode sintered body comprising:
   obtaining an electrode preform by coating the internal electrode paste as set forth in claim 4 on a substrate, and
   firing the electrode preform.

9. A method of manufacturing a multilayer electronic device comprising:
   obtaining a stacked body in which a plural number of green sheets, including dielectric powder and binder, and internal electrode sheets, from the internal electrode paste as set forth in claim 4,
   alternately laminating the green sheets and the internal electrode sheets, and
   firing the stacked body.

* * * * *